United States Patent
Seo et al.

(10) Patent No.: US 7,350,922 B2
(45) Date of Patent: *Apr. 1, 2008

(54) THREE-DIMENSIONAL DISPLAY USING VARIABLE FOCAL LENGTH MICROMIRROR ARRAY LENS

(75) Inventors: Cheong Soo Seo, Seongnam (KR); Gyoung Il Cho, Seoul (KR); Sang Hyune Baek, Suwon (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/423,333

(22) Filed: Jun. 9, 2006

(65) Prior Publication Data

US 2006/0232498 A1    Oct. 19, 2006

Related U.S. Application Data

(63) Continuation-in-part of application No. 11/369,797, filed on Mar. 6, 2006, and a continuation-in-part of application No. 11/347,590, filed on Feb. 4, 2006, and a continuation-in-part of application No. 11/191,886, filed on Jul. 28, 2005, now Pat. No. 7,095,548, and a continuation-in-part of application No. 11/076,616, filed on Mar. 10, 2005, and a continuation-in-part of application No. 11/072,597, filed on Mar. 4, 2005, and a continuation-in-part of application No. 11/072,296, filed on Mar. 4, 2005, now abandoned, and a continuation-in-part of application No. 10/983,353, filed on Nov. 8, 2004, and a continuation-in-part of application No. 10/914,474, filed on Aug. 9, 2004, and a continuation-in-part of application No. 10/893,039, filed on Jul. 16, 2004, now Pat. No. 7,239,438, and a continuation-in-part of application No. 10/887,536, filed on Jul. 8, 2004, and a continuation-in-part of application No. 10/872,241, filed on Jun. 18, 2004, and a continuation-in-part of application No. 10/857,796, filed on May 28, 2004, now Pat. No. 6,934,073, and a continuation-in-part of application No. 10/857,714, filed on May 28, 2004, now Pat. No. 7,161,729, and a continuation-in-part of application No. 10/857,280, filed on May 28, 2004, now Pat. No. 6,999,226, and a continuation-in-part of application No. 10/855,715, filed on May 27, 2004, now Pat. No. 7,031,046, and a continuation-in-part of application No. 10/855,554, filed on May 27, 2004, now Pat. No. 6,970,284, and a continuation-in-part of application No. 10/855,287, filed on May 27, 2004, now Pat. No. 6,934,072, and a continuation-in-part of application No. 10/778,281, filed on Feb. 13, 2004, now Pat. No. 7,077,523.

(51) Int. Cl.
G03B 21/00 (2006.01)
G03B 21/20 (2006.01)
G02B 26/00 (2006.01)
G02B 27/14 (2006.01)
G02B 5/08 (2006.01)

(52) U.S. Cl. .................. 353/10; 353/102; 353/122; 359/292; 359/619; 359/631; 359/633; 359/851

(58) Field of Classification Search ............... 353/10, 353/102, 122; 349/95; 396/18; 359/15, 359/69, 224, 290–292, 298, 630, 631, 633, 359/666, 676, 683, 694, 846, 619, 625–627, 359/851

See application file for complete search history.

(56) References Cited

U.S. PATENT DOCUMENTS

| | | |
|---|---|---|
| 2,002,376 A | 5/1935 | Mannheimer |
| 4,407,567 A | 10/1983 | Michelet |
| 4,834,512 A | 5/1989 | Austin |
| 5,004,319 A | 4/1991 | Smither |
| 5,212,555 A | 5/1993 | Stoltz |
| 5,369,433 A | 11/1994 | Baldwin |
| 5,402,407 A | 3/1995 | Eguchi |
| 5,467,121 A | 11/1995 | Allcock |
| 5,612,736 A | 3/1997 | Vogeley |
| 5,696,619 A | 12/1997 | Knipe |
| 5,881,034 A | 3/1999 | Mano |

| | | | | | | |
|---|---|---|---|---|---|---|
| 5,897,195 | A | 4/1999 | Choate | 2004/0012460 A1 | 1/2004 | Cho |
| 5,986,811 | A | 11/1999 | Wohlstadter | 2004/0021802 A1 | 2/2004 | Yoshino |
| 6,025,951 | A | 2/2000 | Swart | 2004/0052180 A1 | 3/2004 | Hong |
| 6,028,689 | A | 2/2000 | Michaliek | 2004/0246362 A1 | 12/2004 | Konno |
| 6,064,423 | A | 5/2000 | Geng | 2004/0252958 A1 | 12/2004 | Abu-Ageel |
| 6,084,843 | A | 7/2000 | Abe | 2005/0024736 A1 | 2/2005 | Bakin |
| 6,104,425 | A | 8/2000 | Kanno | 2005/0057812 A1 | 3/2005 | Raber |
| 6,111,900 | A | 8/2000 | Suzudo | 2005/0136663 A1 | 6/2005 | Gan |
| 6,123,985 | A | 9/2000 | Robinson | 2005/0174625 A1 | 8/2005 | Huiber |
| 6,282,213 | B1 | 8/2001 | Gutin | 2005/0180019 A1 | 8/2005 | Cho |
| 6,315,423 | B1 | 11/2001 | Yu | 2005/0212856 A1 | 9/2005 | Temple |
| 6,329,737 | B1 | 12/2001 | Jerman | 2005/0224695 A1 | 10/2005 | Mushika |
| 6,498,673 | B1 | 12/2002 | Frigo | 2005/0225884 A1 | 10/2005 | Gim |
| 6,507,366 | B1 | 1/2003 | Lee | 2005/0231792 A1 | 10/2005 | Alain |
| 6,549,730 | B1 | 4/2003 | Hamada | 2005/0264867 A1 | 12/2005 | Cho |
| 6,625,342 | B2 | 9/2003 | Staple | 2005/0264870 A1 | 12/2005 | Kim |
| 6,649,852 | B2 | 11/2003 | Chason | 2006/0012766 A1 | 1/2006 | Klosner |
| 6,650,461 | B2 | 11/2003 | Atobe | 2006/0012852 A1 | 1/2006 | Cho |
| 6,658,208 | B2 | 12/2003 | Watanabe | 2006/0028709 A1 | 2/2006 | Cho |
| 6,711,319 | B2 | 3/2004 | Hoen | 2006/0120706 A1* | 6/2006 | Cho et al. ............... 396/17 |
| 6,741,384 | B1 | 5/2004 | Martin | 2006/0187524 A1 | 8/2006 | Sandstrom |
| 6,784,771 | B1 | 8/2004 | Fan | 2006/0209439 A1 | 9/2006 | Cho |
| 6,833,938 | B2 | 12/2004 | Nishioka | | | |
| 6,885,819 | B2 | 4/2005 | Shinohara | FOREIGN PATENT DOCUMENTS | | |
| 6,900,901 | B2 | 5/2005 | Harada | | | |
| 6,900,922 | B2 | 5/2005 | Aubuchon | JP | 08-043881 | 2/1996 |
| 6,906,848 | B2 | 6/2005 | Aubuchon | JP | 11-069209 | 3/1999 |
| 6,906,849 | B1 | 6/2005 | Mi | JP | 2002-288873 | 10/2002 |
| 6,914,712 | B2 | 7/2005 | Kurosawa | | | |
| 6,919,982 | B2 | 7/2005 | Nimura | * cited by examiner | | |
| 6,934,072 | B1 | 8/2005 | Kim | | | |
| 6,934,073 | B1 | 8/2005 | Kim | *Primary Examiner*—Melissa Jan Koval | | |
| 6,272,002 | B1 | 9/2005 | Lee | | | |
| 6,958,777 | B1 | 10/2005 | Pine | | | |
| 6,970,284 | B1 | 11/2005 | Kim | | | |
| 6,995,909 | B1 | 2/2006 | Hayashi | | | |
| 6,999,226 | B1 | 2/2006 | Kim | | | |
| 7,023,466 | B2 | 4/2006 | Favalora | | | |
| 7,031,046 | B2 | 4/2006 | Kim | | | |
| 7,046,447 | B2 | 5/2006 | Raber | | | |
| 7,068,416 | B2 | 5/2006 | Gim | | | |
| 7,077,523 | B2 | 7/2006 | Seo | | | |
| 7,161,729 | B2 | 1/2007 | Kim | | | |
| 2002/0018407 | A1 | 2/2002 | Komoto | | | |
| 2002/0102102 | A1 | 8/2002 | Watanabe | | | |
| 2002/0135673 | A1 | 9/2002 | Favalora | | | |
| 2003/0058520 | A1 | 3/2003 | Yu | | | |
| 2003/0071125 | A1 | 4/2003 | Yoo | | | |
| 2003/0174234 | A1 | 9/2003 | Kondo | | | |
| 2003/0184843 | A1 | 10/2003 | Moon | | | |
| 2004/0009683 | A1 | 1/2004 | Hiraoka | | | |

(57) ABSTRACT

A three-dimensional display device includes a two-dimensional display displaying a depthwise image, and a variable focal length micromirror array lens receiving light from the two-dimensional display and forming a corresponding image in the required location in space. Each depthwise image represents a portion of an object or scene having the same image depth, and the two-dimensional display displays one depthwise image at a time. The focal length of the variable focal length micromirror array lens changes according to the depth of the depthwise image being displayed. The variable focal length micromirror array lens has enough speed and focusing depth range for the realistic three-dimensional display.

23 Claims, 9 Drawing Sheets

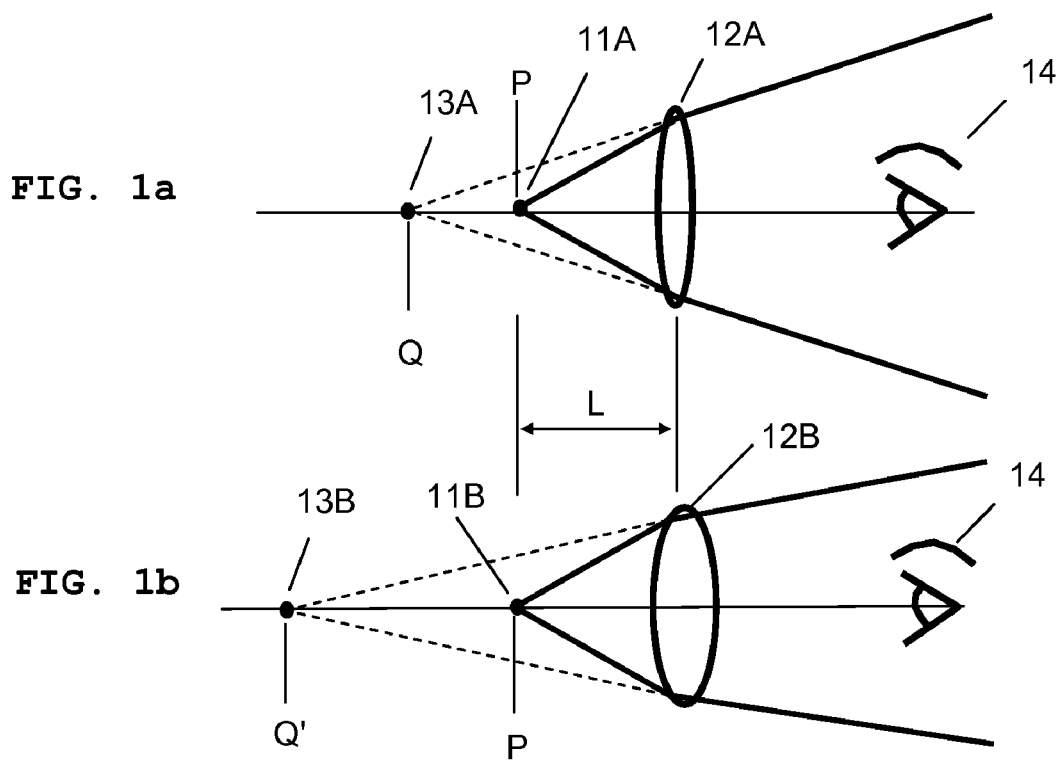
FIG. 1a
FIG. 1b
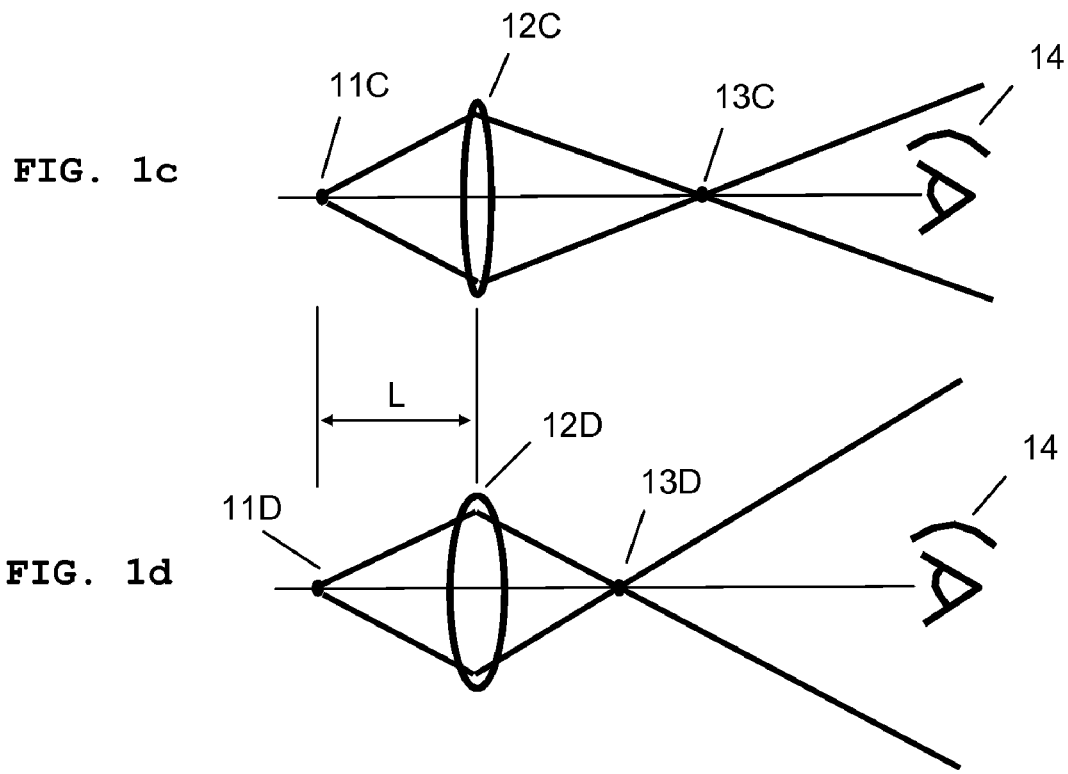
FIG. 1c
FIG. 1d

THREE-DIMENSIONAL DISPLAY USING VARIABLE FOCAL LENGTH MICROMIRROR ARRAY LENS

REFERENCE TO RELATED APPLICATIONS

This application is a continuation-in-part of, and claims priority to U.S. patent application Ser. No. 10/778,281 filed Feb. 13, 2004, now U.S. Pat. No. 7,077,523, U.S. patent application Ser. No. 10/855,554 filed May 27, 2004, now U.S. Pat. No. 6,970,284, U.S. patent application Ser. No. 10/855,715 filed May 27, 2004, now U.S. Pat. No. 7,031,046, U.S. patent application Ser. No. 10/855,287 filed May 27, 2004, now U.S. Pat. No. 6,934,072, U.S. patent application Ser. No. 10/857,796 filed May 28, 2004, now U.S. Pat. No. 6,934,073, U.S. patent application Ser. No. 10/857,714 filed May 28, 2004, now U.S. Pat No. 7,161,729, U.S. patent application Ser. No. 10/857,280 filed May 28, 2004, now U.S. Pat. No. 6,999,226, U.S. patent application Ser. No. 10/872,241 filed Jun. 18, 2004, U.S. patent application Ser. No. 10/893,039 filed Jul. 16, 2004, now U.S. Pat. No. 7,239,438, U.S. patent application Ser. No. 10/887,536 filed Jul. 8, 2004, U.S. patent application Ser. No. 10/914,474 filed Aug. 9, 2004, U.S. patent application Ser. No. 10/983,353 filed Nov. 8, 2004, U.S. patent application Ser. No. 11/072,597 filed Mar. 4, 2005, U.S. patent application Ser. No. 11/072,296 filed Mar. 04, 2005, now abandoned, U.S. patent application Ser. No. 11/076,616 filed Mar. 10, 2005, U.S. patent application Ser. No. 11/191,886 filed Jul. 28, 2005, now U.S. Pat. No. 7,095,548, U.S. patent application Ser. No. 11/347,590 filed Feb. 4, 2006, and U.S. patent application Ser. No. 11/369,797 filed Mar. 6, 2006, all of which are hereby incorporated by reference.

FIELD OF INVENTION

The present invention relates to a method and a device for three-dimensional display. More particularly, this invention relates to a method and a device for three-dimensional display using a variable focal length MicroMirror Array Lens (MMAL) combined with a two-dimensional display.

BACKGROUND OF THE INVENTION

The most popular method for the three-dimensional display by the prior art is one using a binocular parallax phenomenon. This method utilizes a principle that the human brain perceives a three-dimensional image when each eye sees one of two images that are measured at different angles. This method does not actually generate a three-dimensional image in space. Rather, parallax by the observer's eyes is utilized. Therefore, this method has disadvantages that various factors including arbitrary distribution of the viewer's position, binocular disparity due to deviations in the distance between the two eyes, vergence, fatigue accumulation in the eye, accommodation, the relative position change of the three-dimensional image due to viewer's movement, etc., are involved, and such factors must be considered in order to provide a proper three-dimensional display.

Holography is a three-dimensional display method that generates a real image in space. Holography has been used for three-dimensional image display very limitedly due to its technical complexity and high manufacturing cost.

U.S. Pat. No. 4,834,512 to Austin discloses a three-dimensional display having a two-dimensional display, a fluid-filled variable focusing lens, and control means for controlling the display and the lens. The two-dimensional display sequentially presents two-dimensional images representative of the cross sections of an object at different depths. The fluid-filled variable focusing lens is disposed in front of the two-dimensional display and has a membrane that responds to the pressure of the fluid within the lens. Austin's display has a disadvantage that the display is unsuitable for displaying realistic three-dimensional images since the focusing speed of the fluid-filled lens is slow.

U.S. Pat. No. 6,909,555 to Wohlstadter discloses an imaging method and system for creating a three-dimensional image from a two-dimensional image having a plurality of image points or pixels. The imaging system includes an array of variable focal length liquid micro-lenses formed on a self assembling monolayer, where each image point or pixel is in registered alignment with one or more micro-lenses in the array. The liquid micro-lenses formed on self assembling monolayer may have a strong hysteresis problem, which can cause failure of lenses to return to the original shape when the actuating force is disconnected. Also, these lenses require additional compound lens for correcting optical aberrations.

While utilizing a variable focal length lens for three-dimensional display is very promising, the conventional variable focal length lenses have limitation on their performance which includes focusing speed, range of focal length variation, optical focusing efficiency, aperture size, amount of aberration, production cost, etc.

A new three-dimensional image display method and device, which can meet demanding requirements including reducing eye fatigue, flexibility in viewing positions, providing three-dimensional images in the various perspectives without moving viewer's position, practicality of the relative distance between a three-dimensional image and the viewer, 2D/3D compatibility or exchangeability, color expression and resolution that equal or exceed those of HDTV, low manufacturing cost, and no significant data amount increase, have long been in need.

SUMMARY OF THE INVENTION

The present invention contrives to solve the disadvantages of the prior art.

Objectives of the present invention are to provide a three-dimensional display device that has a simple construction and realistic image representation, to provide a three-dimensional display device and method that utilizes a set of depthwise images, to provide a three-dimensional display device that can display a large range of image depth, to provide three-dimensional display device with three-dimensional images in the various perspectives without moving viewer's position, to provide three-dimensional display device that compensates the aberration of the display device, to provide a three-dimensional display device that has two-dimensional/three-dimensional compatibility, and to provide a three-dimensional display device that has a large variation of the image size.

To achieve the above objectives, a three-dimensional display device according to the one embodiment of the present invention comprises a two-dimensional display and a variable focal length MicroMirror Array Lens (MMAL).

The variable focal length MMAL comprises a plurality of micromirrors. Each micromirror has the same function as a mirror. Micromirrors in the variable focal length MMAL are arranged in a shape depending on the geometry of the three-dimensional display screen on a substantially flat plane. The variable focal length MMAL works as a reflective focusing lens by making all light scattered from one point of an object have the same periodical phase and converge at one point on the image plane. Each micromirror in the variable focal length MMAL is controlled to have desired translation and rotation to satisfy the convergence and phase matching conditions for forming an image of the object, wherein each micromirror of the variable focal length MMAL is actuated by the electrostatic and/or the electromagnetic force.

The following US patents and applications describe the variable focal length MMAL: U.S. Pat. No. 6,970,284 to Kim, U.S. Pat. No. 7,031,046 to Kim, U.S. Pat. No. 6,934,072 to Kim, U.S. Pat. No. 6,934,073 to Kim, U.S. Pat. No. 6,999,226 to Kim, U.S. patent application Ser. No. 10/857,714 filed May 28, 2004, U.S. patent application Ser. No. 10/893,039 filed Jul. 16, 2004, U.S. patent application Ser. No. 10/983,353 filed Nov. 8, 2004, U.S. patent application Ser. No. 11/076,616 filed Mar. 10, 2005, and U.S. patent application Ser. No. 11/191,886 filed Jul. 28, 2005, all of which are hereby incorporated by reference.

The variable focal length MMAL has many advantages over conventional variable focus lenses including a very fast response time because each micromirror has a tiny mass, a large focal length variation because large numerical aperture variations can be achieved by increasing the maximum rotational angle of the micromirrors, a high optical focusing efficiency, a large aperture without losing optical performance, low cost because of the advantage of mass productivity of microelectronics manufacturing technology, capability of compensating for the aberration of the system introduced by the medium between the object and the image and/or correcting the defects of the lens system that cause its image to deviate from the rules of paraxial imagery, simpler focusing mechanism, and low power consumption when electrostatic actuation is used to control it.

The variable focal length MMAL changes its surface profile to change its focal length by controlling the rotation and translation of each micromirror. The focal length of the variable focal length MMAL is changed with a plurality of steps in order to generate a three-dimensional image in space.

A depthwise image is a two-dimensional image taken or generated in a plane normal to the image depth direction and represents a portion of a three-dimensional object (or scene) having the same image depth. Each depthwise image is provided with depth information measured along the image depth direction. A set of depthwise images with depth information, each of which represents a different portion of the same object at a different image depth can represent the three-dimensional object and be used as an input for the three-dimensional display device. Depthwise images can be medical cross-sectional images from magnetic resonance imaging (MRI) or computer tomography (CT), computer graphic images, images taken by a three-dimensional imaging system, or the like. The detail for a three-dimensional imaging system which generates depthwise images for three-dimensional display can be found in U.S. patent application Ser. No. 10/822,414 filed Apr. 12, 2004, U.S. patent application Ser. No. 10/979,624 filed Nov. 2, 2004, and U.S. patent application Ser. No. 11/208,115 filed Aug. 19, 2005.

The two-dimensional display displays one depthwise image at a time, and the variable focal length MMAL receives light from the two-dimensional display and forms a corresponding image of each depthwise image at the required location in space using depth information of the depthwise image by changing the focal length of the variable focal length MMAL. The image formed by the variable focal length MMAL is located at the corresponding depth along the surface normal direction of the three-dimensional display screen, which is defined as a three-dimensional image display direction. The location of the image formed in space is adjusted by changing the focal length of the variable focal length MMAL, which is synchronized with the two-dimensional display so that the variable focal length MMAL can have a focal length corresponding to the depth information of the depthwise image displayed in the two-dimensional display. As a set of depthwise images representing an object are sequentially displayed in the two-dimensional display, a three-dimensional image of the object is formed in space accordingly and perceived as three-dimensional by a viewer. The number of depthwise images representing the object at a given moment is defined as number of depths, which depends on the depth resolution requirement, the refresh rate of the two-dimensional display, and the focusing speed of the variable focal length MMAL, and may increase for a better image quality. A set of depthwise images representing an object at a given moment is displayed at least at the persistent rate of the average human eye. The focusing speed of the variable focal length MMAL is at least equal to the product of the persistent rate of the average human eye and the number of depths so that three-dimensional images formed in space looks realistic to the viewer.

The three-dimensional display device of the present invention provides a variable three-dimensional image display direction. The viewer can view three-dimensional images in the various perspectives without moving viewer's position. The three-dimensional image display direction is changed by controlling the rotation and translation of each micromirror in the variable focal length MMAL without macroscopic mechanical movements of the three-dimensional image display device.

The three-dimensional display device of the present invention compensates for the aberration of the display system using the variable focal length MMAL. Since the variable focal length MMAL is an adaptive optical component, the variable focal length MMAL compensates for phase errors of light introduced by the medium between an object and its image and/or corrects the defects of the three-dimensional display device that may cause the image to deviate from the rules of paraxial imagery by controlling individual micromirrors in the variable focal length MMAL.

Because conventional refractive lenses are positioned to be perpendicular about optical axis, surface profile of the lens is generally axis-symmetric. However, the variable focal length MMAL is a reflective lens. In order to have normal incident optical geometry onto the variable focal length MMAL, the three-dimensional display device can further comprise a beam splitter positioned in the path of light between the two-dimensional display and the variable focal length MMAL. Alternatively, the variable focal length MMAL can be positioned to deflect light into the three-dimensional display screen so that the path of the light reflected by the variable focal length MMAL is not blocked without using a beam splitter, When the variable focal length MMAL is tilted about an axis (tilting axis), which is perpendicular to the normal direction of the two-dimensional display surface so that the normal direction of the plane of the variable focal length MMAL is different from the normal direction of the two-dimensional display surface, the profile of the variable focal length MMAL is symmetric about an axis which is perpendicular to the tilting axis and the normal direction of the two-dimensional display surface. The tilted variable focal length MMAL can cause non axis-symmetric aberration. To have a desired focal length and compensate for non axis-symmetric aberration, each micromirror is provided with one translational motion along the normal axis of the plane of the variable focal length MMAL and two rotational motions about two axes in the plane of the variable focal length MMAL.

In order to obtain a color three-dimensional image, the variable focal length MMAL is controlled to compensate for chromatic aberration by satisfying the phase matching condition for each wavelength of Red, Green, and Blue (RGB), or Yellow, Cyan, and Magenta (YCM), respectively. The three-dimensional image display device may further comprise a plurality of bandpass filters for color imaging. Furthermore, the variable focal length MMAL can be controlled to satisfy phase matching condition at an optimal wavelength to minimize chromatic aberration, wherein optimal wavelength phase matching is used for getting a color image. The variable focal length MMAL is controlled to satisfy phase matching condition for the least common multiple wavelength of Red, Green, and Blue or Yellow, Cyan, and Magenta lights to get a color image.

The three-dimensional display device further comprises an image input unit for providing depthwise images with the depth information of each depthwise image to the two-dimensional display.

The three-dimensional display device may further comprise an auxiliary lens having a variable or fixed focal length, and the three-dimensional image is formed by the variable focal length MMAL and the auxiliary lens together. The auxiliary lens has the role of changing or extending the range of focal length variation of the three-dimensional display device, or increasing the size of a three-dimensional display screen.

The invention also provides a three-dimensional display method. A depthwise image is displayed in a two-dimensional display. Then, a variable focal length MMAL focuses the light received from the two-dimensional display image at the required location in space according to depth information of the depthwise image. The above two steps are repeated for all depthwise images representing an object at a given moment within the persistent rate of the average human eye. As the set of depthwise images representing the object at a given moment are sequentially displayed by the above steps, a three-dimensional image is formed in space accordingly. Displaying the depthwise image using the two-dimensional display is synchronized with changing the focal length of the variable focal length MMAL. In order to provide realistic three-dimensional video images, the focusing speed of a variable focal length lens is at least equal to the product of the persistent rate of the average human eye and the number of depths.

The three-dimensional image display direction is changed by controlling the rotation and translation of each micromirror in the variable focal length MMAL.

The three-dimensional display device further comprises an image input unit for providing images having the depth information of each pixel to the two-dimensional display.

For both embodiments, the focal length of the variable focal length MMAL may be controlled to be fixed so that the three-dimensional display device can be used as a two-dimensional display device. The two-dimensional display displays either normal two-dimensional images, all-in-focus images, or depthwise images.

The advantages of the present invention are: (1) since the three-dimensional display device actually generates three-dimensional images in space, the device does not suffer from the disadvantage of prior art device using parallax including imaging difficulties due to considerations for arbitrary distribution of the viewer's position, and binocular disparity due to deviations in the distance between the two eyes, vergence, accommodation, and the relative position change of the three-dimensional image due to viewer's movement; (2) The high depth resolution three-dimensional image is provided since the focal length variation speed is very fast; (3) The three-dimensional image can be viewed in the various perspectives without moving user's position; (4) the aberration of the three-dimensional display system can be compensated; (5) the cost for providing three-dimensional image data is inexpensive since the data need only depth information in addition to two-dimensional image information, and thus there is no significant increase in data amount; (6) the device is very simple because there is no macroscopic mechanical displacement for the variable focal length MMAL; (7) the device requires small power consumption since the variable focal length MMAL is actuated by electrostatic force; and (8) the device can be easily converted to a two-dimensional display and vice versa.

Although the present invention is briefly summarized, the full understanding of the invention can be obtained by the following drawings, detailed description and appended claims.

DESCRIPTION OF THE FIGURES

These and other features, aspects and advantages of the present invention will become better understood with reference to the accompanying drawings, wherein:

FIG. 1 is schematic diagrams showing how the depth of an image is changed as the focal length of a lens is changed;

DETAILED DESCRIPTION OF THE INVENTION

FIG. 1 illustrates the general principle regarding the distance or depth of an image formed by a lens, and the focal length of the lens. When the light from an object passes through a lens, it converges or diverges depending on the distance L between the object and the lens, and the focal length of the lens. In the description of the present invention, a lens means an optical element that focuses light, and is not confined to a refractive type lens.

FIG. 1a shows that the light from an object 11A passes through a lens 12A and then diverges at a different angle. FIG. 1b is a similar diagram for a lens 12B having a shorter focal length. The light refracted by the lenses 12A and 12B forms virtual images 13A and 13B, respectively. When a viewer 14 sees the refracted light, the viewer perceives objects 11A and 11B, which is positioned at point P, as existing at points Q and Q', respectively.

FIG. 1c shows that the light from an object 11C passes through a lens 12C and then converges to form a real image 13C. FIG. 1d is a similar diagram for a lens 12D having a shorter focal length. When the viewer 14 sees objects 11C and 11D through lenses 12C and 12D, the viewer perceives objects 11C and 11D as real images 13C and 13D, respectively.

For a given distance L between the object and the lens, the position of the image formed by the lens varies depending on the focal length of the lens. The position of the image can be calculated with Gauss' Lens Formula. FIGS. 1a and 1b show that the virtual image 13A is nearer to the viewer 14 with the lens 12A having a longer focal length, and the virtual image 13B is farther from the viewer 14 with the lens 12B having a shorter focal length. FIGS. 1c and 1d show that the real image 13C is nearer to the viewer 14 with the lens 12C having a longer focal length, and the real image 13D is farther from the viewer 14 with the lens 12D having a shorter focal length.

FIG. 1 demonstrates that the position of a virtual or real image changes according to the focal length of a lens, and the position of the image will change continuously as the focal length varies continuously.

Figure 2:
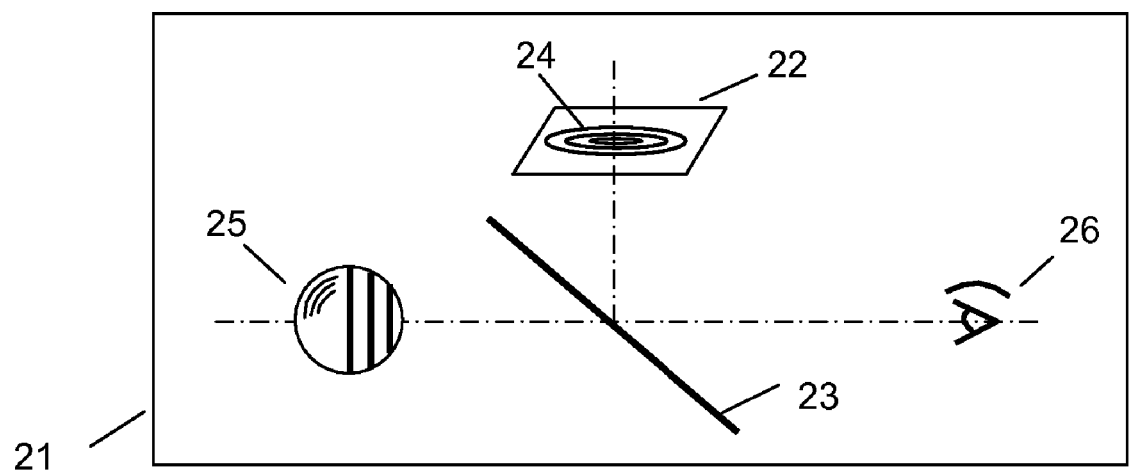
FIG. 2 is a schematic diagram showing a three-dimensional display device of the present invention.

FIG. 2 schematically illustrates a three-dimensional display device 21 according to one embodiment of the present invention. The three-dimensional display device 21 includes a two-dimensional display 22 and a variable focal length MicroMirror Array Lens (MMAL) 23. The two-dimensional display 22 displays one depthwise image 24 at a time. The two-dimensional display 22 displays only pixels that should be displayed at the same depth at a given frame. The variable focal length MMAL 23 receives the light from the two-dimensional display 22 and forms a corresponding image at the required location in space to generate a three-dimensional image 25. The location of the image formed in space depends on depth information of the depthwise image and is adjusted by changing the focal length of the variable focal length MMAL 23. The variable focal length MMAL 23 is synchronized with the two-dimensional display 22 so that the variable focal length MMAL 23 can have a focal length corresponding to the depth information of the depthwise image 24 displayed in the two-dimensional display 22. As a set of depthwise images representing an object are sequentially displayed in the two-dimensional display 22, a three-dimensional image 25 of the object is formed in space accordingly and perceived as three-dimensional by a viewer 26.

Figure 3A:
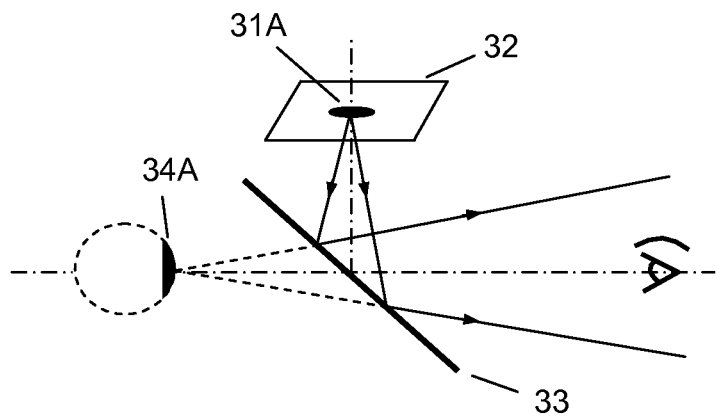
FIG. 3 is schematic diagrams showing how a two-dimensional display and a variable focal length MMAL display three-dimensional images.
Figure 3B:
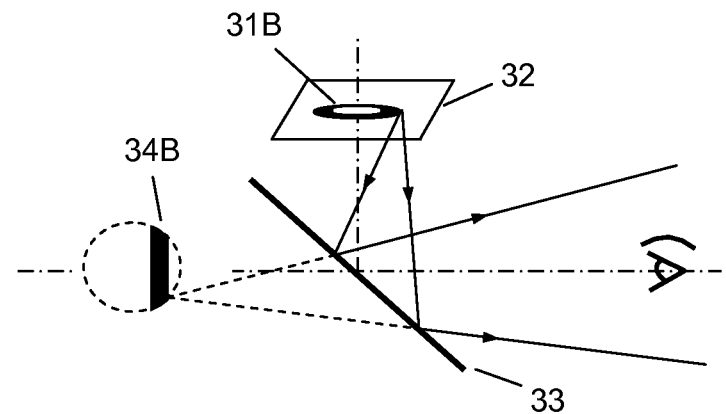
Figure 3C:
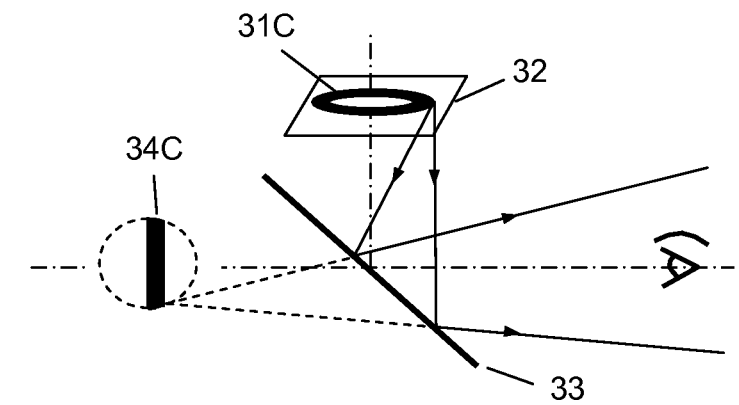

FIG. 3 illustrates how a two-dimensional display and a variable focal length MMAL display three-dimensional images. The number of depthwise images representing an object at a given moment (number of depths) depends on the depth resolution requirement, the refresh rate of the two-dimensional display, and the focusing speed of the variable focal length MMAL and may increase for a better image quality. As an illustrative example, the object is represented by three depthwise images 31A, 31B, and 31C at a given moment, each of which represents a portion of the object having the same image depth. The two-dimensional display 32 displays one depthwise image at a time. The variable focal length MMAL 33 receives light from the two-dimensional display 32 and forms corresponding images 34A, 34B, and 34C at the required location in space to generate a three-dimensional image. The set of depthwise images representing the object at a given moment are sequentially displayed in the two-dimensional display 32 within the persistent rate of the average human eyes.

In order to have realistic three-dimensional video images in space, focusing speed of the variable focal length MMAL 33 and refresh rate of the two-dimensional display 32 must be equal or greater than the product of the persistent rate of the average human eye and the number of depths. For example, assume that the persistent rate of the average human eye is 30 Hz and the number of depths is 10. In order to have realistic three-dimensional video images, the focusing speed of the variable focal length MMAL and the refresh rate of two-dimensional display are at least equal to 300 Hz, respectively. The variable focal length MMAL 33 of the present invention is capable of changing the focal length fast enough to generate realistic three-dimensional video images unless the depth resolution requirement is extremely high.

Figure 4:
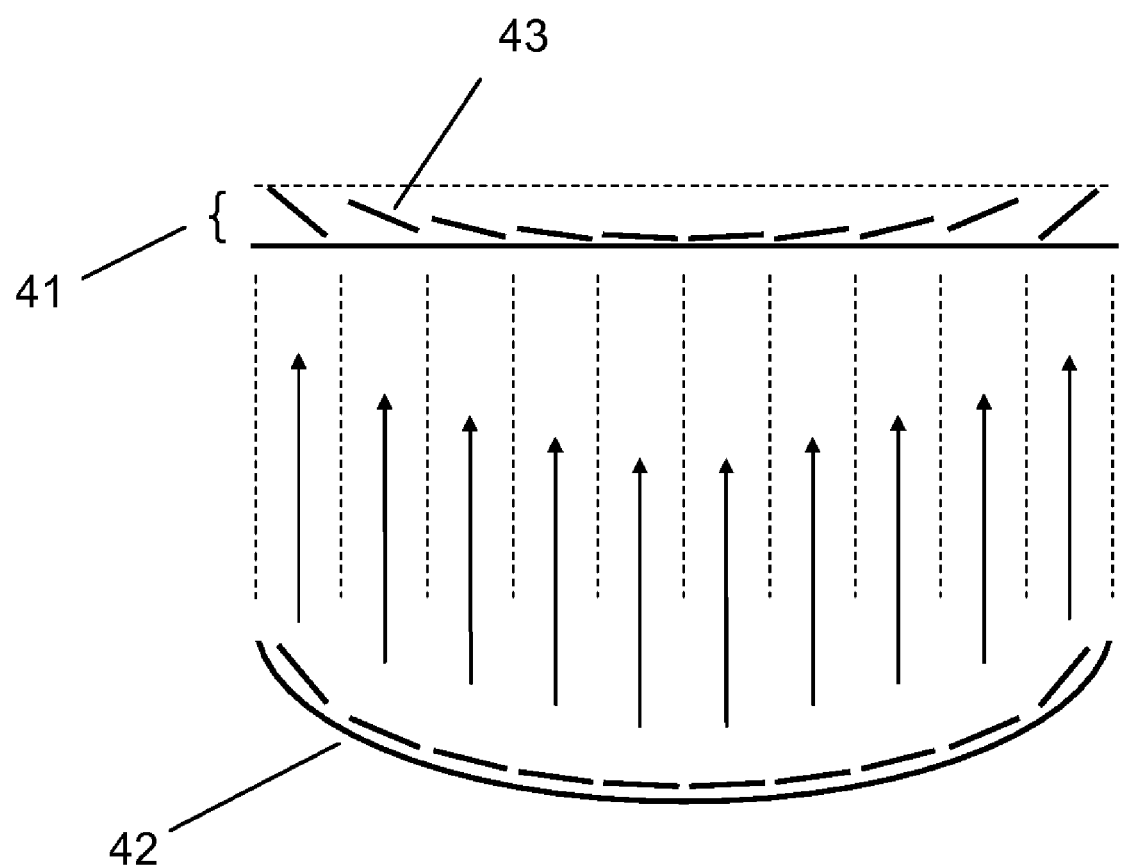
FIG. 4 shows the principle of a variable focal length MMAL.

FIG. 4 shows the principle of a variable focal length MMAL 41. There are two conditions for a perfect lens. The first is a converging condition that all light scattered by one point of an object should converge into one point of the image plane. The second is the same phase condition that all the converging light should have same phase at the image plane. To satisfy the perfect lens conditions, the surface shape of conventional reflective lens 42 is generated to have all light scattered from one point of an object to be converged into one point on the image plane and have the optical path length of all the converging light to be same. Even though the optical path length of the converging light is different, the same phase condition can be satisfied because a phase of light is periodic. The conventional reflective lens 42 satisfying perfect lens conditions can be replaced by a variable focal length MMAL 41 comprising a plurality of micromirrors 43. The rotation and translation of each micromirror 43 is controlled to have a required surface profile.

Figure 5:
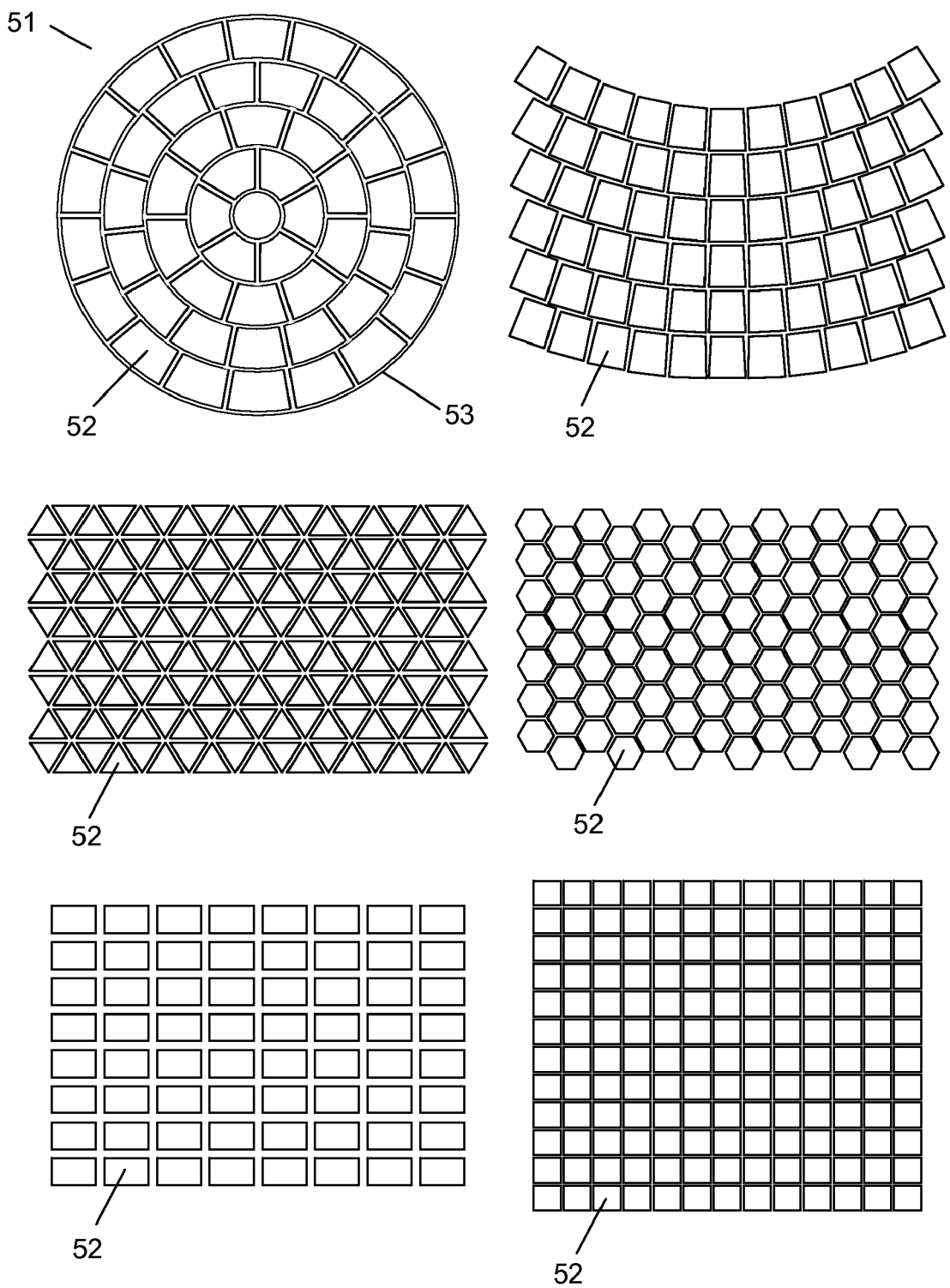
FIG. 5 shows exemplary arrangements of micromirrors for various variable focal length MMALs.

FIG. 5 shows exemplary arrangements of micromirrors in various variable focal length MMALs 51. Micromirrors 52 can have various shapes such as a fan shape, a hexagonal shape, a rectangular shape, a square shape, a triangular shape, mixed shapes, etc. Preferably, micromirrors are arranged depending on the geometry of the three-dimensional display screen although it is not necessary. Each micromirror 52 of the variable focal length MMAL 51 is electrostatically and/or electromagnetically controlled by actuating components 53. The mechanical structures holding each micromirror and the actuating components to rotate and translate micromirrors 52 are located on the opposite side of the reflective surface of micromirrors 52 so that micromirrors 52 are to be closer to one another thereby increasing the effective reflective area or optical efficiency.

The variable focal length MMAL must meet the following requirements to be used in the three-dimensional display device. First, it must have a focal length change speed fast enough for three-dimensional display. Second, it must have a large range of numerical aperture change, since the depth range that can be displayed depends on the range of numerical aperture change. Third, it needs to have a large diameter depending on constructions of three-dimensional displays.

The variable focal length MMAL meets three requirements. The response speed of the micromirror exceeds the persistent rate of the average human eyes times the number of depths unless the depth resolution requirement is extremely high. It is possible to make the focal length change within hundreds of micro-seconds. The range of numerical aperture change of the variable focal length MMAL is large since the range of focal length variation of the variable focal length MMAL is large. So, the variable focal length MMAL can have a greater range of display depths, which is an essential requirement for a three-dimensional display. Also, the variable focal length lens MMAL can have a large diameter. In a lens having a continuous shape, it becomes difficult to make an ideal curved surface as the size of the lens becomes larger. However, there is no difficulty in enlarging the size of the variable focal length MMAL, since the variable focal length MMAL comprises discrete micromirrors.

The variable focal length MMAL is also an adaptive optical component compensating the aberration of the display system by controlling the translational motion and/or the rotational motion of each micromirror.

Since the MMAL is a reflective lens, the optical system of the three-dimensional display device cannot be aligned in a line. An optical arrangement, in which the reflected light is not blocked by the two-dimensional display, is required.

Figure 6:
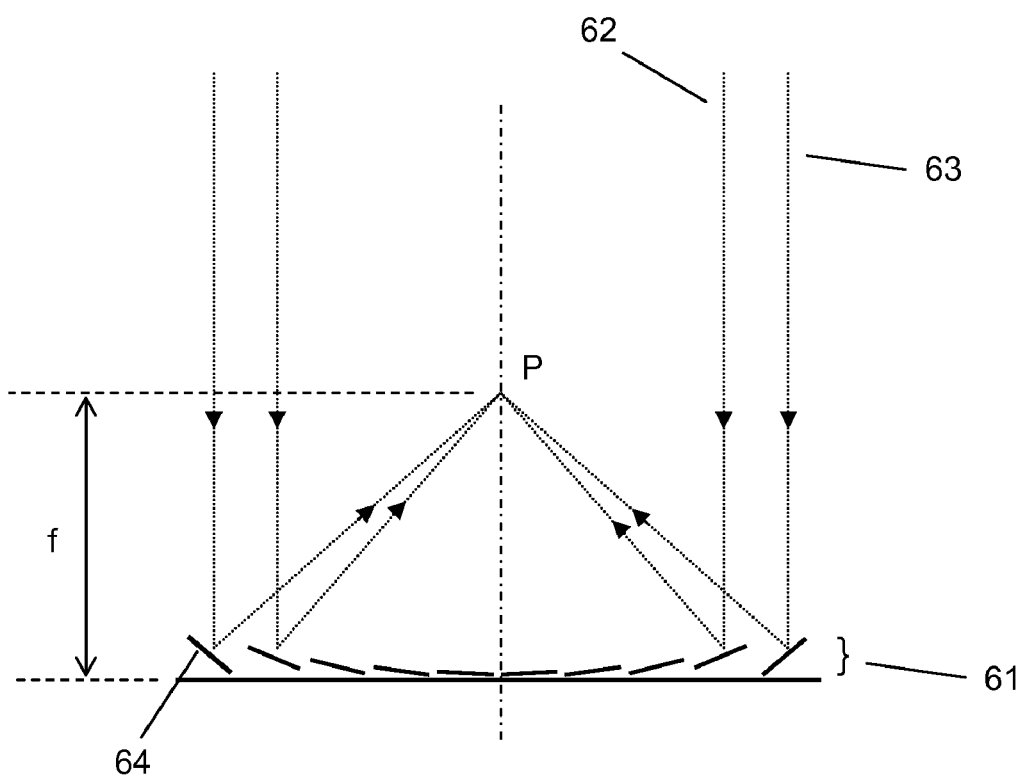
FIG. 6 is a schematic diagram showing how a variable focal length MMAL works as a lens.

FIG. 6 illustrates how a variable focal length MMAL 61 works as a lens. Arbitrary scattered lights 62 and 63 are converged into one point P on the image plane by controlling the position of each of the micromirrors 64. Phases of arbitrary lights 62 and 63 can be adjusted to be the same by rotating and translating each of the micromirrors 64. The required translational displacement is at least half of the wavelength of light.

The focal length f of the variable focal length MMAL 61 is changed by controlling the rotation and/or translation of the micromirror 64. The operation of the MMAL 61 is possible by controlling only rotation without controlling translation even though it can not satisfy the phase condition. In this case, the imaging quality of the lens 61 generated by controlling only rotation is degraded by the aberration. Pure translation without rotation can satisfy the two imaging conditions by Fresnel diffraction theory. The lens generated by the control of only translation has the aberration too. The smaller the size of the micromirrors 64, the less the aberration. Even though the quality of the lens with one motion is lower than the lens with rotation and translation, the lens with one motion has the advantage that its control and fabrication is easier than the lens with both rotation and translation.

It is desired that each of the micromirrors 64 has a curvature because the ideal shape of a conventional reflective lens has a curvature. However, the aberration of the lens with flat micromirrors 64 is not much different from the lens with curvature if the size of each micromirror is small enough. For most applications, flat micromirrors can be used.

Figure 7:
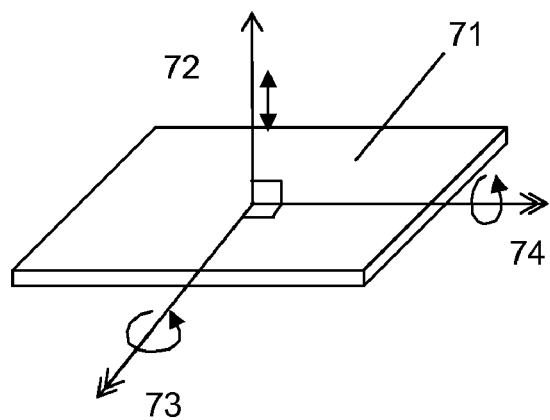
FIG. 7 is a schematic diagram showing two rotational axes and one translational axis of a micromirror.

As shown in FIG. 7, the present invention provides each micromirror 71 with three degree-of-freedom motion; one translational motion 72 along the normal axis of the plane of a variable focal length MMAL, and two rotational motions 73 and 74 about two axes in the plane of the variable focal length MMAL. The translational and rotational motions of each micromirror in the variable focal length MMAL are required to deflect light to arbitrary direction and to compensate for the non axis-symmetric aberration of the display system.

Figure 8A:
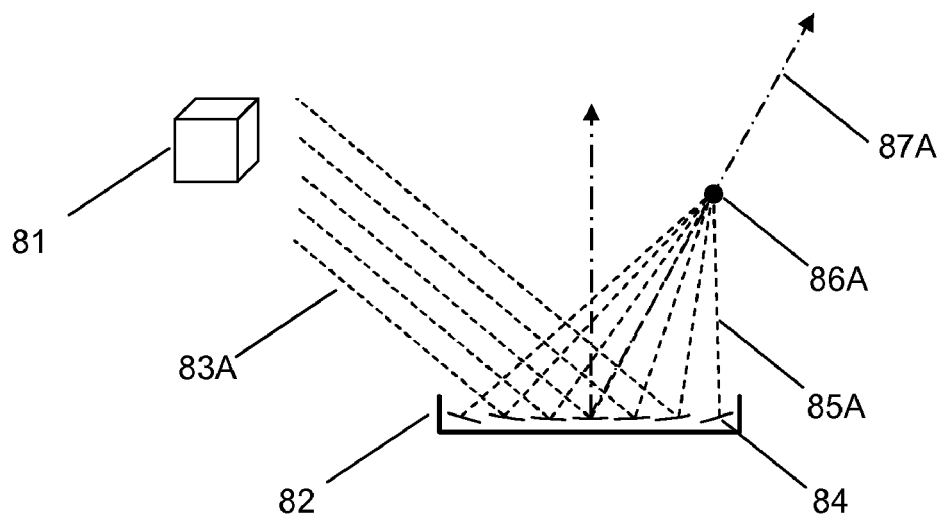
FIG. 8 shows how the three-dimensional image display direction of the three-dimensional display changes.

The FIG. 8 shows how the three-dimensional image display direction of the three-dimensional display changes for viewing three-dimensional images in the various perspectives without moving viewer's position. A bunch of light from a two-dimensional display 81 is focused by the variable focal length MMAL 82. In FIG. 8a, the light 83A from the two-dimensional display 81 is reflected by each micromirror 84. The reflected light 85A is focused at the required location 86A in space according to the depth information of the image displayed in the two-dimensional display. As depthwise images are displayed sequentially in the two-dimensional display, a three-dimensional image is formed along the three-dimensional image display direction 87A.

Figure 8B:
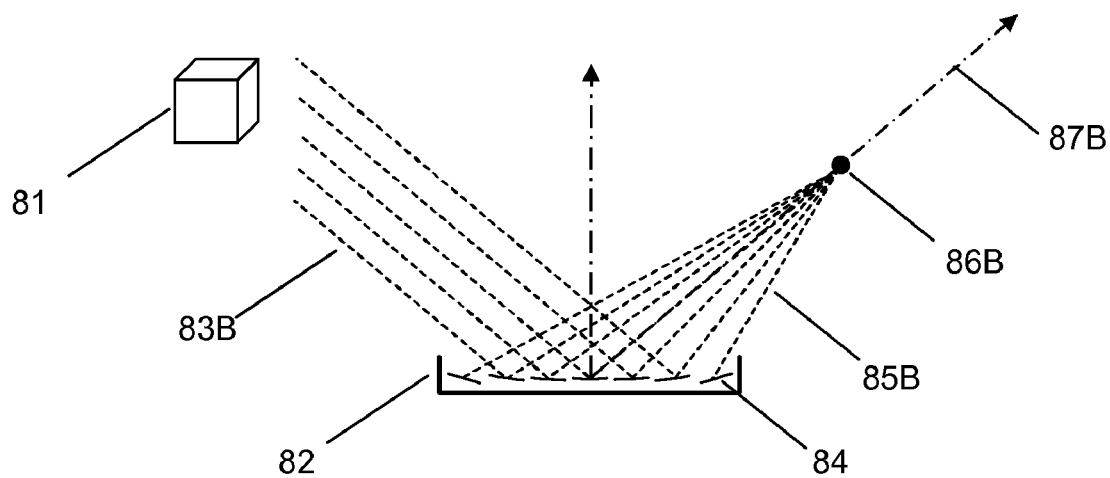

As shown in FIG. 8b, the variable focal length MMAL 82 can form a three-dimensional image at the different location using the same depthwise images from the two-dimensional display 81 without macroscopic movements of the display system. The variable focal length MMAL 82 receives the light 83B from the two-dimensional display 81. By changing the respective angles of the micromirrors 84, the variable focal length MMAL 82 focuses the reflected light 85B at different position 86B in space and forms a three-dimensional image along the different three-dimensional image display direction 87B.

Figure 9:
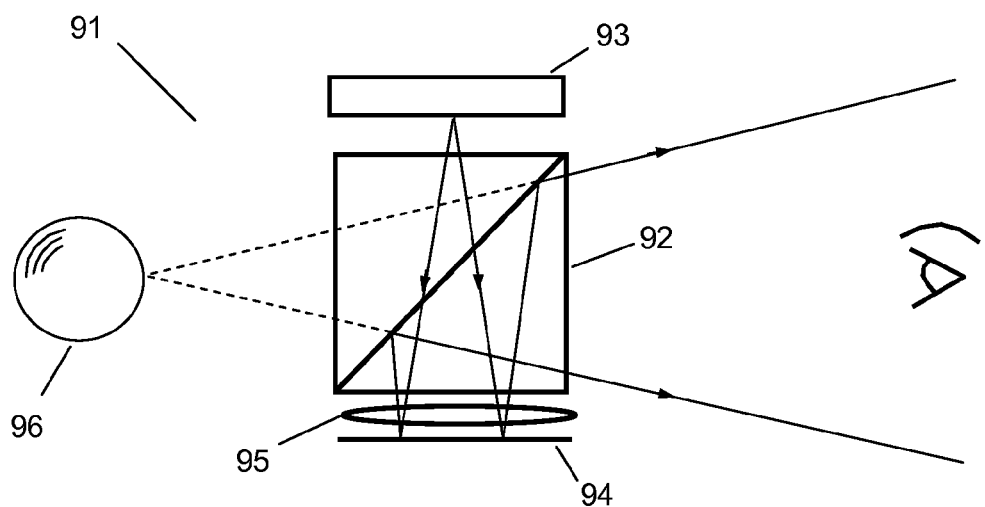
FIG. 9 is a schematic diagram showing a beam splitter and an auxiliary lens added to the three-dimensional display device.

FIG. 9 shows an arrangement in which the three-dimensional display device 91 further comprises a beam splitter 92 positioned in the path of light between a two-dimensional display 93 and a variable focal length MMAL 94. The two-dimensional display 93 and the variable focal length MMAL 94 are arranged parallel with each other. The beam splitter 92 changes the direction of the light by 90°, and thus simulating an in-line optical arrangement. The variable focal length MMAL is positioned perpendicular to the light path.

Alternatively, as shown in FIG. 2, the variable focal length MMAL 23 can be positioned to deflect light into the three-dimensional display screen so that the path of the light reflected by the variable focal length MMAL 23 is not blocked without using a beam splitter, When the variable focal length MMAL 23 is tilted about an axis (tilting axis), which is perpendicular to the normal direction of the two-dimensional display surface, so that the normal direction of the plane of the variable focal length MMAL is different from the normal direction of the two-dimensional display surface, the profile of the variable focal length MMAL is symmetric about an axis which is perpendicular to the tilting axis and the normal direction of the two-dimensional display surface. The tilted variable focal length MMAL 23 can cause non axis-symmetric aberrations. To have a desired focal length and compensate for non axis-symmetric aberration, each micromirror is provided with one translational motion along the normal axis of the plane of the variable focal length MMAL 23 and two rotational motions about two axes in the plane of the variable focal length MMAL 23, as shown in FIG. 7. The arrangement in FIG. 2 has advantages of simple structure and wider field of view since the distance between the two-dimensional display 22 and the variable focal length MMAL 23 is closer than that of the arrangement with the beam splitter 92.

As shown in FIG. 9, the three-dimensional display device may further include an auxiliary lens 95 having a fixed or variable focal length and positioned adjacent to the variable focal length MMAL 94. The three-dimensional image 96 is formed by the effective focal length of the variable focal length MMAL 94 and the auxiliary lens 95. With the auxiliary lens 95, the focusing range of the three-dimensional display device can be extended or changed to a desired range. A refractive type Fresnel can be used as an auxiliary lens 95.

Figure 10:
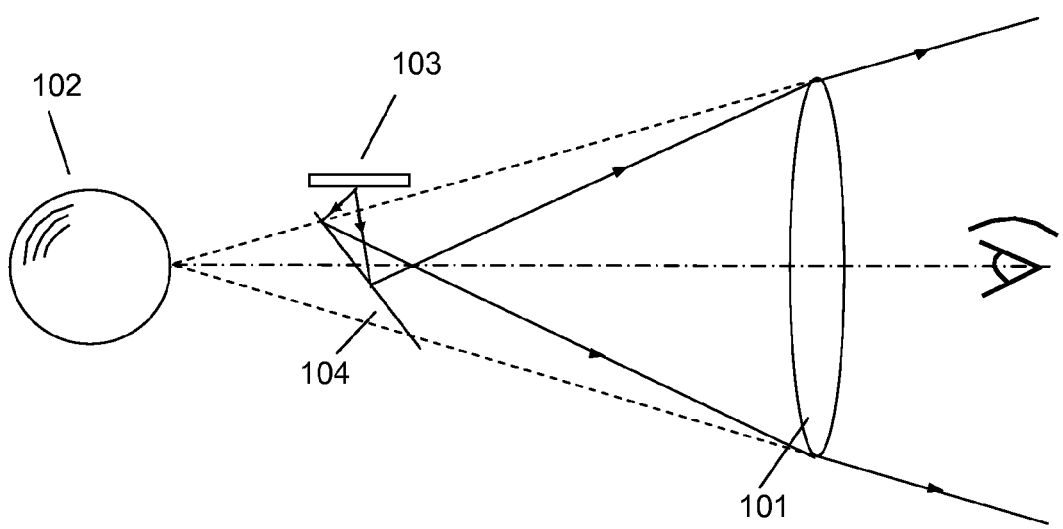
FIG. 10 is a schematic diagram showing a magnifying lens added to the three-dimensional display device.

As shown in FIGS. 2 and 9, the variable focal length MMALs 23, 94 should have the size of the screen. For a device having a large display screen, it is almost impossible or extremely expensive to make a variable focal length MMAL having a size as large as that of the screen. FIG. 10 shows that the three-dimensional display device may further include an auxiliary lens 101 that magnifies the three-dimensional image 102, in order to overcome the limitation in size. The auxiliary lens 101 may be an ordinary refractive lens or a refractive Fresnel lens. The screen size becomes the size of the auxiliary lens 101, which has a fixed or variable focal length. A two-dimensional display 103 and a variable focal length MMAL 104 can have a compact size that is much smaller than the size of the auxiliary lens 101. The effective focal length of the three-dimensional display device is varied by changing the focal length of the variable focal length MMAL 104.

The three-dimensional display device can be easily converted into a two-dimensional display device by fixing the focal length of the variable focal length MMAL, where the two-dimensional display 103 displays either normal two-dimensional images or depthwise images.

Method for displaying a three-dimensional image may be one using a virtual image as illustrated in FIGS. 1a and 1b, or one using a real image as illustrated in FIGS. 1c and 1d. The method using a real image has an advantage that it enables more realistic display since the image is generated closer to the viewer, and has a disadvantage that the range of display is limited between the viewer and the screen. With the method using a virtual image, the image is generated behind the screen. This method has an advantage that it can display an image having depth ranging from the screen to the infinity.

Figure 11:
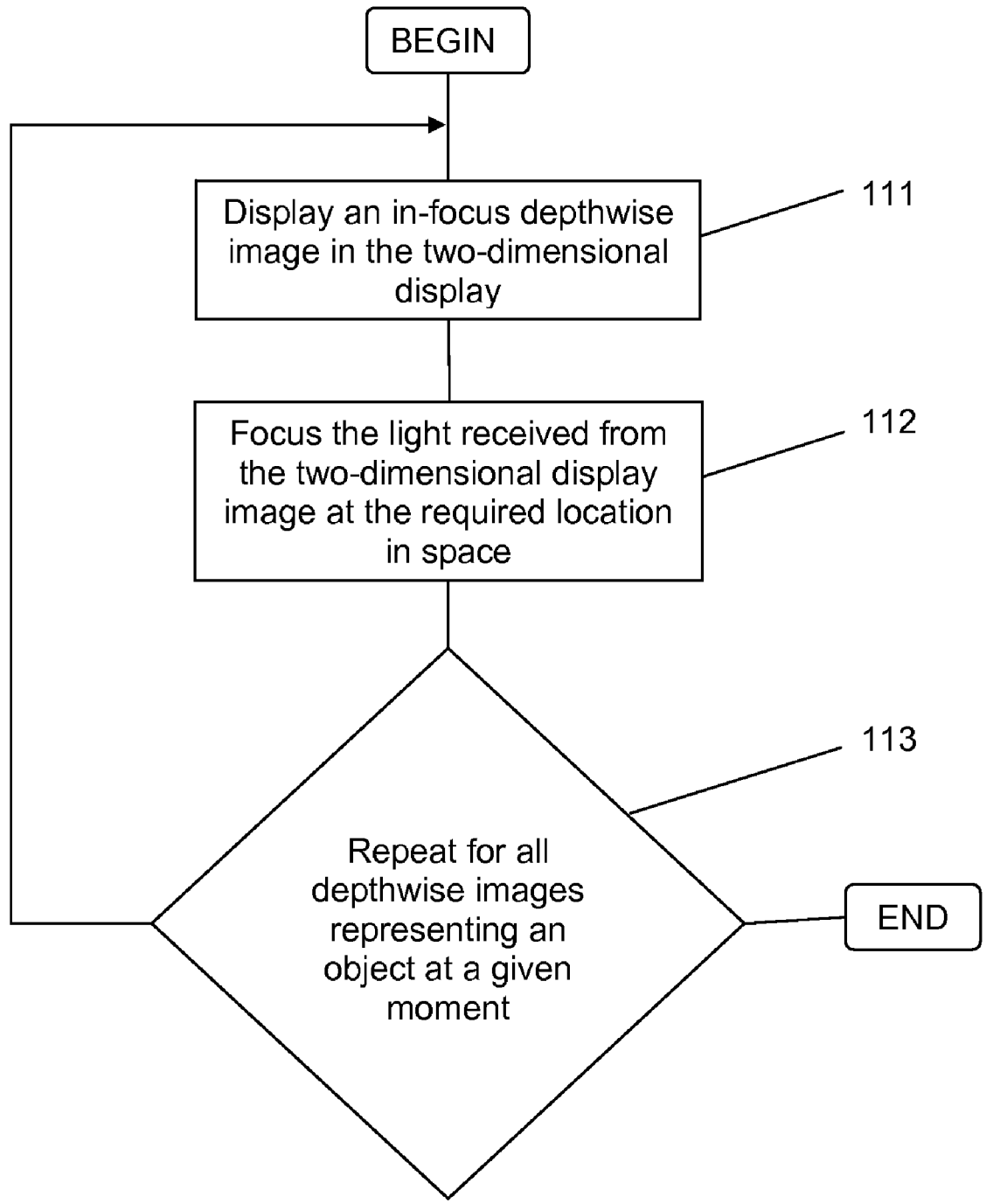
FIG. 11 is a flow diagram showing a three-dimensional display method of the present invention.

FIG. 11 shows a three-dimensional display method according to the invention. In step 111, a depthwise image is displayed in a two-dimensional display. In step 112, the variable focal length MMAL forms the corresponding image in space by receiving light from the two-dimensional display and reflecting the light to the required location using depth information of the depthwise image. Step 113 makes steps 111 and 112 repeated for all depthwise images representing an object at a given moment within the persistent rate of the average human eye. Each depthwise image represents a portion of an object having the same image depth. As a set of depthwise images representing the object at a given moment are sequentially displayed by the above steps, a three-dimensional image is formed in space accordingly. In order to have realistic three-dimensional video images, the focusing speed of a variable focal length MMAL is at least equal to the product of the persistent rate of the average human eye and the number of depths.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. The three-dimensional display device comprising:
  a) a two-dimensional display displaying one depthwise image at a time, wherein each depthwise image represents a portion of a three-dimensional object having the same image depth; and
  b) a variable focal length MicroMirror Array Lens (MMAL), comprising a plurality of micromirrors, for receiving light from the two-dimensional display and forming a corresponding image of each depthwise image at the required location in space using depth information of the depthwise image by changing the focal length of the variable focal length MMAL.

2. The three-dimensional display device of claim 1, wherein each micromirror in the variable focal length MMAL is actuated by the electrostatic force.

3. The three-dimensional display device of claim 1, wherein the focal length of the variable focal length MMAL is changed by controlling the rotation and translation of each micromirror in the variable focal length MMAL.

4. The three-dimensional display device of claim 1, wherein the focusing speed of the variable focal length MMAL is at least equal to the product of the persistent rate of the average human eye and the number of image depths.

5. The three-dimensional display device of claim 1, wherein the aberration of the three-dimensional display is corrected by controlling the rotation and translation of each micromirror in the variable focal length MMAL.

6. The three-dimensional display device of claim 1, wherein the variable focal length MMAL is positioned so that the path of the light reflected by the variable focal length MMAL is not blocked by the two-dimensional display.

7. The three-dimensional display device of claim 1, wherein the variable focal length MMAL is tilted about a tilting axis so that the normal direction of the plane of the variable focal length MMAL is different from the normal direction of the two-dimensional display surface.

8. The three-dimensional display device of claim 7, wherein the profile of the variable focal length MMAL is symmetric about an axis which is perpendicular to the tilting axis and the normal direction of the two-dimensional display surface.

9. The three-dimensional display device of claim 7, wherein each micromirror has one translational motion along the normal axis of the plane of the variable focal length MMAL and two rotational motions about two axes in the plane of the variable focal length MMAL.

10. The three-dimensional display device of claim 1, further comprising a beam splitter positioned in the path of light between the two-dimensional display and the variable focal length MMAL.

11. The three-dimensional display device of claim 1, wherein the three-dimensional image display direction is changed by controlling the rotation and translation of each micromirror in the variable focal length MMAL for viewing three-dimensional images in the various perspectives without moving viewer's position.

12. The three-dimensional display device of claim 1, wherein the variable focal length MMAL is controlled to compensate for chromatic aberration by satisfying the phase matching condition for each wavelength of Red, Green, and Blue (RGB) or Yellow, Cyan, and Magenta (YCM), respectively, to get a color image.

13. The three-dimensional display device of claim 1, wherein the variable focal length MMAL is controlled to satisfy phase matching condition at an optimal wavelength to minimize chromatic aberration, wherein the optimal wavelength phase matching is used for getting a color image.

14. The three-dimensional display device of claim 1, wherein the variable focal length MMAL is controlled to satisfy phase matching condition for the least common multiple wavelength of Red, Green, and Blue or Yellow, Cyan, and Magenta lights to get a color image.

15. The three-dimensional display device of claim 1, further comprising an image input unit for providing depthwise images with the depth information of each depthwise image to the two-dimensional display.

16. The three-dimensional display device of claim 1, wherein the variable focal length MMAL changes its focal length to provide a three-dimensional image.

17. The three-dimensional display device of claim 1, wherein the variable focal length MMAL are synchronized with the two-dimensional display so that the variable focal length MMAL can have a focal length corresponding to the depth information of the depthwise image displayed in the two-dimensional display.

18. The three-dimensional display device of claim 1, wherein a set of depthwise images representing an object at a given moment is displayed at least at the persistent rate of the average human eye.

19. The three-dimensional display device of claim 1, further comprising an auxiliary lens for increasing the size of the three-dimensional display screen.

20. The three-dimensional display device of claim 1, further comprising an auxiliary lens for changing the range of focal length variation of the three-dimensional display device.

21. The three-dimensional display device of claim 1, wherein the focal length of the variable focal length MMAL is fixed to be used as a two-dimensional display device.

22. A three-dimensional display method comprising the steps of:
   a) displaying a depthwise image in a two-dimensional display;
   b) focusing the light received from step a) in space using a variable focal length MMAL according to depth information of the depthwise image; and
   c) repeating steps a) and b) for all depthwise images representing an object at a given moment within the persistent rate of the average human eye.

23. The three-dimensional display method of claim of 22, wherein displaying the depthwise image using the two-dimensional display is synchronized with changing the focal length of the variable focal length MMAL.

* * * * *